A. BURKE.
METHOD OF MAKING CELLULOID SPECTACLE FRAMES.
APPLICATION FILED JAN. 12, 1917.
1,220,600.  
Patented Mar. 27, 1917.
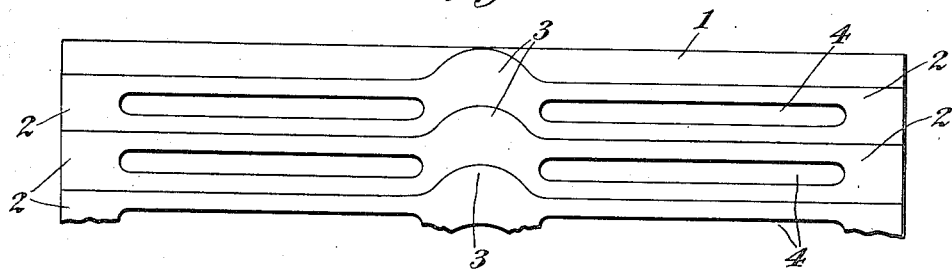
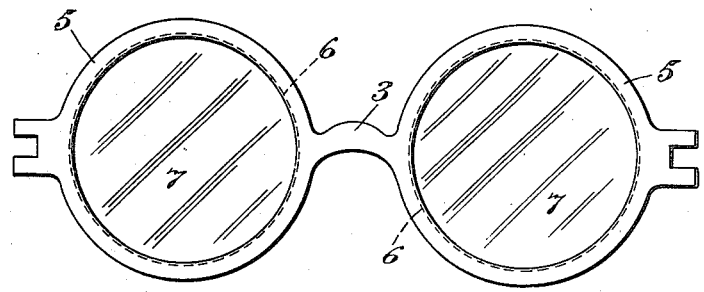
Inventor  
Alfred Burke  
By his Attorney

UNITED STATES PATENT OFFICE.

ALFRED BURKE, OF BROOKLYN, NEW YORK.

METHOD OF MAKING CELLULOID SPECTACLE-FRAMES.

1,220,600.     Specification of Letters Patent.     Patented Mar. 27, 1917.

Application filed January 12, 1917. Serial No. 141,947.

*To all whom it may concern:*

Be it known that I, ALFRED BURKE, a citizen of the United States, residing in the borough of Brooklyn, in the city of New York, county of Kings, and State of New York, have invented certain new and useful Improvements in Methods of Making Celluloid Spectacle-Frames, of which the following is a specification.

My invention relates particularly to the manufacture of spectacle or eye-glass frames, in which the bridge-piece and the two lens-supports are made of a single piece of celluloid.

Heretofore such one-piece frames have been stamped or cut out of a sheet of celluloid in a completed shape. That method of making the frames results in considerable waste of stock. For example, all of the material contained within the spaces occupied by the lenses is cut away and removed as waste, in the old method of making the frame.

According to my invention, by which I make the frames from long narrow strips, I avoid wastage of material and am enabled to produce considerably more frames from a sheet of celluloid of a given size than with the old method.

In the accompanying drawing illustrating my invention, Figure 1 is a fragment of a sheet of celluloid cut into strips to form the frames and, Fig. 2 is a front view of a completed frame with the lenses in place.

In carrying out my invention I take a sheet of celluloid 1 and heat it in any suitable manner. I then cut from the sheet a continuous series of long narrow strips 2, the middle portion 3 of each strip being shaped to form the bridge-piece of the frame. At each side of the bridge-piece and intermediate the upper and lower edges of the strip are formed slits 4. While the material is in a plastic state, the edges of the slits 4 are spread apart in any suitable manner to the shape required to form the lens receiving openings of the lens supports 5 of the completed frame. After the material has been spread to the required shape, the openings are preferably slightly reamed out to remove any irregularities and to present a smooth unbroken contour.

Extending circumferentially around the edge of each lens support 5 is formed a groove 6. The lenses 7 are then placed in the grooves of the lens supports, while the latter are under the influence of heat. After the lenses are in position the frame is suddenly cooled by immerging it in cold water or any other suitable manner. This causes the material of the lens support, which as heretofore described has been spread under heat, to contract so as to firmly secure the lenses in place in their supports.

What I claim is:

A method of making one piece spectacle frames which consists in heating a sheet of celluloid; cutting a continuous series of long narrow strips from the sheet, the middle portion of each strip being shaped to form the bridge-piece of the frame; slitting the material at each side of the bridge-piece through part of its length; and spreading the material surrounding the slits, while in a plastic state, to the shape required to form lens supports.

ALFRED BURKE.